E. GRANSAULL.
TELEPHONE ATTACHMENT.
APPLICATION FILED JUNE 30, 1915.
1,304,308.
Patented May 20, 1919.
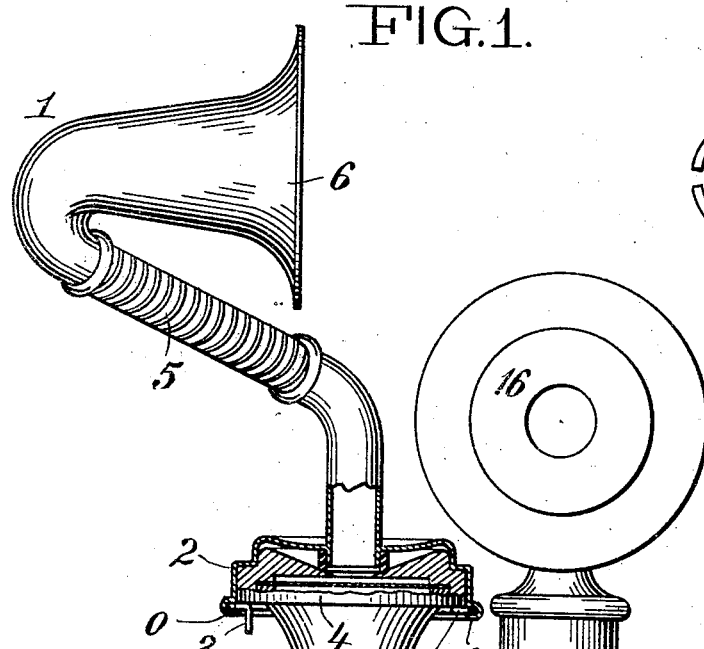
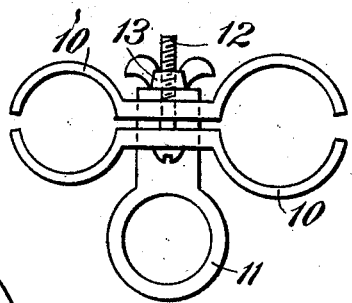
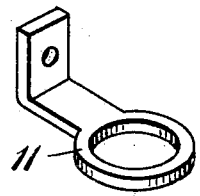
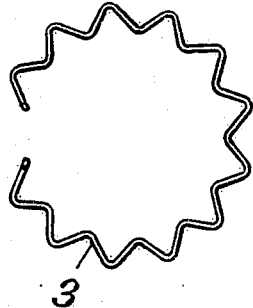
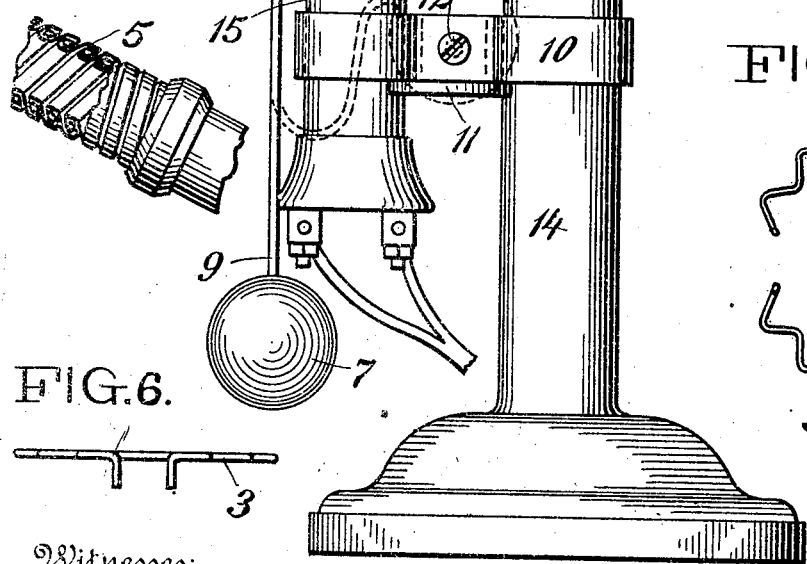
Inventor
Eugene Gransaull
By his Attorney

UNITED STATES PATENT OFFICE.

EUGENE GRANSAULL, OF NEW YORK, N. Y.

TELEPHONE ATTACHMENT.

1,304,308.                    Specification of Letters Patent.    Patented May 20, 1919.

Application filed June 30, 1915. Serial No. 37,170.

*To all whom it may concern:*

Be it known that I, EUGENE GRANSAULL, a subject of the King of Great Britain, residing at New York, in the county of New York and State of New York, have invented new and useful Telephone Attachments, consisting especially of improvements on the United States patent issued to me January 13th, 1914, No. 1,084,328.

My invention relates to improvements in telephone attachments in which a sound amplifier having a flexible tubular member is attached to the receiver of the telephone; in which a weight approximately equal to the weight of the telephone receiver is suspended by a cord or the like from the switch-hook of the telephone; and in which a divided clamp, supporting a shelf or bracket adapted to receive the said weight, engages the telephone post and the telephone receiver. This clamp is attached in such manner that the receiver is held rigid in a position admitting of the free movement of the switch-hook. The latter is held down only by the said weight, raised by lifting the said weight and kept raised by placing the weight on the shelf attached to the divided clamp. Thus the telephonic connection is made by placing the weight on the said shelf, and broken by simply taking or knocking it off.

The sound amplifier has a trumpet end, a cup-shaped end and a tubular member, all or part of which is constructed of flexible hose, connecting the said ends. The tubular member is continued part way through the cup-shaped end and the part so protruding inside the cup is surrounded with cushioning. The mouth of the telephone receiver is inserted in the cup end of the amplifier in such manner that the cushioned tubular member protruding inside the cup end, is in juxtaposition to the diaphragm of the receiver without touching the same, and the amplifier is so attached to the receiver by any suitable means, of which I prefer the zig-zag holder of resilient material shown in the accompanying drawing.

It is easy to perceive that the introduction of the flexible tubular member of the amplifier will admit of positioning the same and holding it in any position to suit the peculiar requirements of every user. This part is constructed of what is known as "flexible hose", which is in common use for various purposes. It is preferably of metal formed in spiral and should be stiff enough to retain any position into which it is put.

The objects of my improvements are similar to those stated in my earlier Patent, No. 1,084,328 already referred to, namely, first, to provide improved means for making and breaking telephonic connections without moving the receiver; second, to provide improved means of saving time in the use of telephones; third, to provide improved means of using the telephone in such manner that the person using it need not employ his hand or hands for the purpose after the connection is made, but may have both hands entirely free during the conversations, while waiting to begin the conversations and while waiting to resume interrupted conversations; fourth, to provide improved means of bringing and keeping in juxtaposition to the ear of the speaker when in the act of talking into the transmitter of the telephone the trumpet end of the sound-amplifier attached to the receiver, without requiring the use of either of his hands for the purpose; fifth, to provide means for amplifying the acoustic effects of the receiver; and to provide other improvements that will appear in the specification and claims below.

But I attain these objects readily and more simply by the devices illustrated in the accompanying drawings, in which—

Figure 1 is a front elevation partly in section showing the sound-amplifier mounted on a desk telephone and the means of attaching it; the divided clamp furnished with a shelf or bracket and engaging the telephone post as well as holding the receiver rigid and clear of the switch-hook; the switch-hook, up and down; the weight connected thereto depending therefrom and resting on the said shelf or bracket.

Fig. 2 is a plan view showing the divided clamp and the shelf or bracket for the weight, attached to the clamp.

Fig. 3 is a perspective view showing the said shelf or bracket detached from the said clamp.

Fig. 4 is an inverted plan view of a spring which serves as one means of attaching the sound-amplifier to the telephone receiver.

Fig. 5 shows in section the structure of the flexible hose used in the tubular member of the amplifier.

Fig. 6 is an elevation of the zig-zag holder or spring shown in Fig. 4, showing the ends thereof, which when the holder is in use, hang down. The attachment of the amplifier to the receiver is accomplished as follows, when the zig-zag holder is employed.

The rim of the cup-end of the amplifier is formed with a flange on the inside. The mouth of the receiver is thrust into the cup and held tightly against the cushioned protruding end of the tubular member of the amplifier. Then the zig-zag holder is introduced into the flange in the rim of the cup by forcing the same around and over the wide part of the mouth of the receiver, thus clamping the receiver and the amplifier together.

Figs. 1 to 4 of the drawings show one form of my invention comprising a sound-amplifier 1, attached at its cup-shaped end 2 by means of the zig-zag spring 3 to the mouth of the receiver 4; a flexible tubular member 5, of the said amplifier and its trumpet end 6; the weight 7 depending from the switch-hook 8, by a flexible cord 9; the divided clamp 10, the shelf or bracket 11, and the screw 12 and nut 13, whereby the said bracket is attached to the said clamp and the latter to the telephone post 14, and the receiver 15.

The purpose of the flexible tubular part, 5 of the amplifier, 1 is to allow of such a positioning of the said amplifier that the trumpet end, 6 thereof will be in juxtaposition to the ear of any speaker, when in the act of talking into the transmitter 16 of the telephone.

When it is desired to make a telephonic connection, all that is necessary is to lift the weight, 7 and place it on the shelf, or bracket, 11. Thereupon the speaker is at liberty to use the telephone without having to employ either hand to support the receiver or hold it to his ear. Having finished using the telephone, it is necessary only to remove the weight 7, from the bracket 11 and allow the weight to hang by its cord 9, whereupon the switch-hook will be pulled down to its normal position when at rest and the telephonic connection broken. It will be seen that this device affords a much simpler and much more satisfactory means of making and breaking the connection than the device shown in my earlier Patent No. 1,084,328.

While I have illustrated and described only one specific embodiment of my improvements on my earlier Patent No. 1,084,328, having still especially in mind the type of telephone called "desk-phone," I am aware that it is susceptible of modifications and of adaptability to the ordinary wall telephone, the pay-station telephone, the telephone exchange systems and every other kind of telephone; and I do not desire to be limited to the precise form shown—especially in regard to the method of breaking and making the telephonic connection, which I accomplish by exerting force or pressure on the switch-hook and relieving the said force or pressure independently of the telephone receiver, which is at all times held free of the switch-hook.

Having thus fully described my invention and its relation, as an improvement, to my earlier United States Patent No. 1,084,328, I claim and desire to protect by Letters Patent of the United States:

1. The combination with a telephone, of a divided clamp adapted to engage and hold the telephone-post and adapted to engage the telephone receiver and to hold the same rigidly clear of the switch-hook of the telephone, and a weight equipped with a cord adapted detachably to suspend the said weight from the switch-hook of the telephone, and a bracket affixed to the said clamp adapted to receive and hold the said weight.

2. The combination with a telephone, equipped with a sound amplifier rigidly attachable to and carried by the receiver of the telephone, of a divided clamp adapted to engage and hold the telephone-post and adapted to engage the telephone receiver and to hold the same rigidly clear of the switch-hook of the telephone, and a weight equipped with a cord adapted detachably to suspend the said weight from the switch-hook of the telephone, and a bracket affixed to the said clamp adapted to receive and hold the said weight.

3. The combination with a telephone, of a sound amplifier having a tubular member of flexible hose, a zig-zag spring adapted to hold the said amplifier rigidly to the mouth of the telephone-receiver, a divided clamp adapted to engage the telephone-post and to hold the telephone-receiver rigidly clear of the switch-hook of the telephone, a weight carrying means for suspending the same from the switch-hook of the telephone, a bracket attachable to the said divided clamp and adapted to receive and support the said weight, and means for holding the receiver in a vertical position, and means for holding the delivery end of the sound amplifier in such position as to bring the mouth of the said amplifier in juxtaposition to the ear of the speaker when in the act of normally talking into the transmitter of the telephone.

EUGENE GRANSAULL.

Witnesses:
  MARION C. FISEUNE,
  WILLIAM DONAHUE.